(12) United States Patent
Schwersmann

(10) Patent No.: US 6,679,773 B2
(45) Date of Patent: Jan. 20, 2004

(54) WORKING DEVICES CONTAINED IN A ROTOR HOUSING OF AN AGRICULTURAL HARVESTER

(75) Inventor: Berthold Schwersmann, Bad Iburg (DE)

(73) Assignee: Claas Selbstfahrende Erntemaschinen GmbH, Harsewinkel (DE)

(*) Notice: Subject to any disclaimer, the term of this patent is extended or adjusted under 35 U.S.C. 154(b) by 5 days.

(21) Appl. No.: 10/020,071

(22) Filed: Dec. 14, 2001

(65) Prior Publication Data
US 2002/0086721 A1 Jul. 4, 2002

(30) Foreign Application Priority Data
Dec. 14, 2000 (DE) .......................... 100 62 429

(51) Int. Cl.⁷ .............. A01F 12/10; A01F 7/06; B02B 3/06
(52) U.S. Cl. ............... 460/70; 460/69; 460/80
(58) Field of Search .............. 460/67, 68, 69, 460/70, 84, 80, 107, 119; 56/14.6

(56) References Cited

U.S. PATENT DOCUMENTS

| 3,828,793 | A | * | 8/1974 | Gochanour | 460/70 |
| 3,828,794 | A | * | 8/1974 | Gochanour et al. | 460/68 |
| 4,175,568 | A | * | 11/1979 | Nooyen | 460/69 |
| 4,250,896 | A | * | 2/1981 | Wagstaff et al. | 460/70 |
| 4,900,290 | A | * | 2/1990 | Tanis | 460/70 |
| 5,257,959 | A | * | 11/1993 | Tanis | 460/67 |
| 5,387,153 | A | * | 2/1995 | Tanis | 460/68 |
| 6,050,894 | A | * | 4/2000 | Johnson | 460/68 |
| 6,296,566 | B1 | * | 10/2001 | Tanis et al. | 460/70 |

FOREIGN PATENT DOCUMENTS

| DE | 24 30 304 | 1/1975 |
| DE | 28 30 162 | 1/1980 |
| DE | 36 01 359 | 7/1987 |
| DE | 197 22 079 | 12/1998 |
| DE | 198 02 672 | 12/1999 |

* cited by examiner

Primary Examiner—Árpád F Kovács
(74) Attorney, Agent, or Firm—Husch & Eppenberger, LLC; Robert E. Muir; Robert C. Haldiman

(57) ABSTRACT

A self-propelled harvester having a drivable separating rotor rotatably mounted in a rotor housing with a bearing in an end wall covering an inlet opening of the rotor housing at a front end of the separating rotor, further comprising a lower edge transverse and operatively connected to the bearing of the end wall.

16 Claims, 2 Drawing Sheets

WORKING DEVICES CONTAINED IN A ROTOR HOUSING OF AN AGRICULTURAL HARVESTER

TECHNICAL FIELD OF THE INVENTION

The present invention relates to agricultural machinery and more specifically to separating housings, which contain devices for improving the processing of harvested crop and which reduce wear to the devices therein.

DESCRIPTION OF THE RELATED ART

There are various types of agricultural harvesting machines, such as combine harvesters. Combine harvesters are available in both axial or hybrid systems. Hybrid systems have transverse threshers and axially operating separating devices. Combine harvesters are equipped with one or more rotor housings and where there are multiple rotor housings, the rotor housings are parallel to one another. The rotor housings have separating rotors and internal guide strips with perforated surfaces. The front ends of the separating rotors are fitted with conveyor screw sections for receiving material and outer casing conveyor members. The outer casing conveyor members cooperate with the guide strips to transport the harvested mixture of grain, straw and chaff between the separating rotor and housing, towards a rearward end of the separating rotor for separating the grain from the harvested mixture. The material inlet end of an axle of the separating rotors is supported in an end wall, which extends downward to a central axle of the rotor housing, thereby closing the top half of the inlet end of the rotor housing.

German Patent No. DE 24 30 304 describes an agricultural machine having an axial threshing and/or separating device, wherein the lower edge of an inlet end wall extends horizontally from one side of the cylindrical rotor housing to the other. The separating rotor is mounted in the rotor housing in such a way that the conveying flights of the conveying screw sections project up to the material inlet opening. The separating rotor's front edges are relatively close to the inside surface of the end wall. The end-face closure of the material inlet opening of the rotor housing increases air flow speed inside the separating unit, by means of an end wall, which has a positive effect on the separation process and restricts the undisturbed intake of the harvested material. Due to the rotational movement of the separation rotor, the mixture of material is increasingly drawn in the region of the underside edge of the end wall, which is opposite the direction of rotation of the separating rotor. With an almost horizontal course for this underside edge of the end wall, the material inlet opening is restricted such that it inevitably causes problems in the flow of material and can even result in complete blockage of the delivery of material. Moreover, often the end wall and, more particularly, the opposite edge itself does not sufficiently resist extreme loads. The conveying flight sweeping past the edge of the end wall, opposite the direction of rotation of the separating rotor, causes long-stemmed plant parts, if present, to be caught by the conveying flights. At the same time, the direction of flow of the harvested material is abruptly diverted and sometimes drawn over the edge and into the conveyor housing with extreme loading peaks. As a result, deformations, or at least strains, occur on the end wall, which have a negative effect particularly on the separating rotor and its mounting members.

The present invention is directed to overcoming one or more of the problems or disadvantages set forth above.

SUMMARY OF THE INVENTION

It is an aspect of the present invention to provide an apparatus for overcoming one or more of the problems or disadvantages set forth above.

In a preferred embodiment of the invention there is provided a self-propelled harvester having a drivable separating rotor, rotatably mounted in a rotor housing and having a bearing in an end wall covering an inlet opening of the rotor housing at a front end of the separating rotor, further comprising a lower edge transverse and operatively connected to the bearing of the end wall.

In another preferred embodiment of the invention, the material inlet regions are enlarged to reduce jamming of material and wear in these inlet regions.

In yet another embodiment of the invention, higher throughputs are achieved by two separating rotors surrounded, at least in part, by two rotor housings. These rotor housings have two bearing operatively connected to a side wall having a lower edge.

In still another embodiment of the invention, a rotor housing is described which contains lower edges of end walls arranged at an obtuse angle relative to one another so that material inlet regions at the front ends of the separating rotors are larger than the regions shielded by the end walls to accommodate larger quantities of harvested material without problem.

In yet another preferred embodiment of the invention, a rotor housing contains lower edges of end walls that are arc-shaped to ensure that harvested material located between the lower edges of the end walls and the carrier members of the separating rotors are reliably carried out from intake gaps. Such harvested material is carried between the lower edges and the end walls, in radial directions of the separating rotor.

In another embodiment of the invention there is provided a rotor housing containing lower edges of end walls therein, wherein the lower edges are arc-shaped having curvatures extending upwardly in vertical directions to process larger quantities of harvested material without blockages of material in an intake region of the separating.

In still another aspect of the invention, there is provided a rotor housing containing lower edges of end walls therein, wherein the lower edges of the end walls are arranged such that they are offset relative to one another. Further, the lower edges of the end walls, which oppose the directions of rotation of each of the rotor housings are offset in a larger vertical direction from the horizontal relative to the lower edges of the end walls, which do not oppose the directions of travel.

In yet another embodiment of the invention, there are two rotor housings, having two separating rotors which rotate opposite one another directionally, and working elements in mirror image from one another for processing a large quantity of harvested material, efficiently delivered by threshing elements.

In yet another embodiment of the invention, rotor housings containing lower edges of end walls are profiled so that the lower edges accumulate more harvested materials to reduce wear of the lower edges of the end walls.

In still another embodiment of the invention there is provided a rotor housing containing lower edges of end walls, having high-profiles, and lubrication channels, having wear-reducing lubricants in their interior for feeding lubrication to the bearings.

In still another embodiment of the invention there is provided a rotor housing containing lower edges of end walls and stripper bars, having a curved shape and with ends pointing in the directions of rotation assigned to the end walls on the inside. The rotor housing supports the continuous movement of the harvested material from an intake region of a separating rotor for facilitating the harvested material removal process.

The above aspects are merely illustrative examples of a few of the innumerable aspects and embodiments associated with the present invention and should not be deemed an all-inclusive listing in any manner whatsoever.

BRIEF DESCRIPTION OF THE DRAWINGS

Reference is now made to the drawings, which illustrate the best known mode of carrying out the invention and wherein the same reference characters indicate the same or similar parts throughout the views.

DETAILED DESCRIPTION

Figure 1:
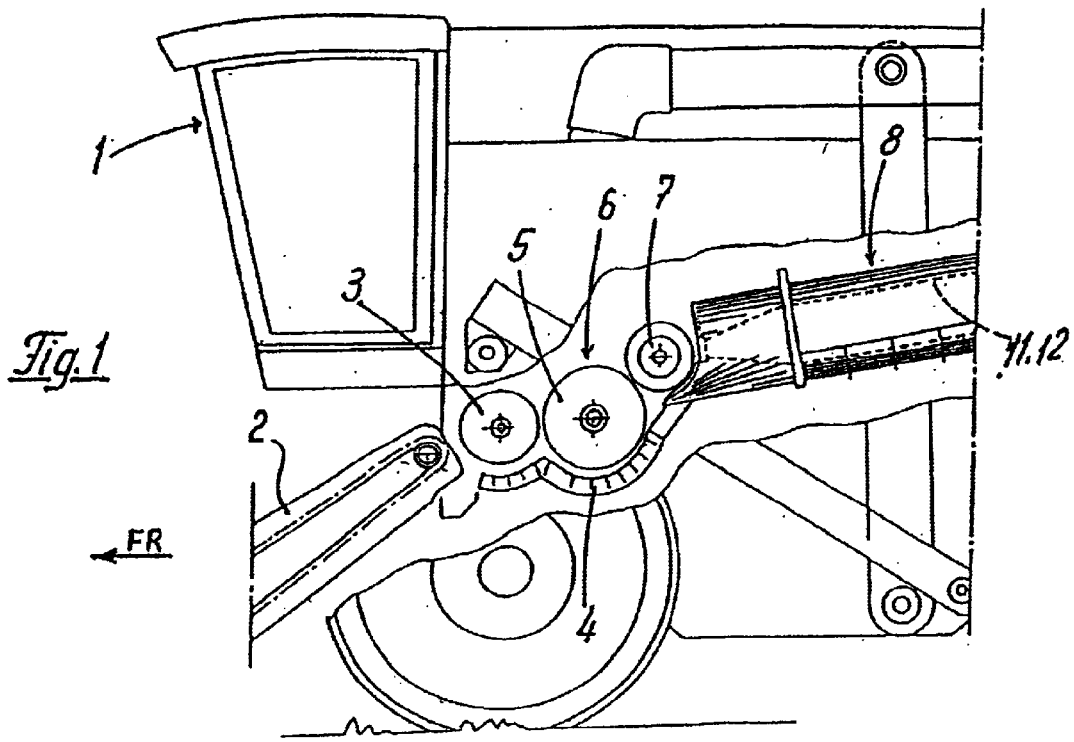
FIG. 1 is a side view of a front portion of a self-propelled harvesting machine constructed as a combine harvester.

FIG. 1 shows a front portion of a self-propelled combine harvester 1 having a feed rake 2, which feeds harvested material to a pre-accelerator 3. The pre-accelerator 3 moves the harvested material to a threshing mechanism 6, having a threshing basket 4 and a threshing cylinder 5 for threshing. The threshed harvested material from the threshing mechanism 6 is fed via a delivery drum 7 to an axial separating device 8, having two rotor housings 9, 10 arranged substantially parallel to one another. The rotor housings 9, 10 have guide strips (not shown), which support a transport of a hank of the harvested material in a rearward region of the axial separating device 8. The guide strips are known to those skilled in the art and are, thus, not explained in detail.

Figure 2:
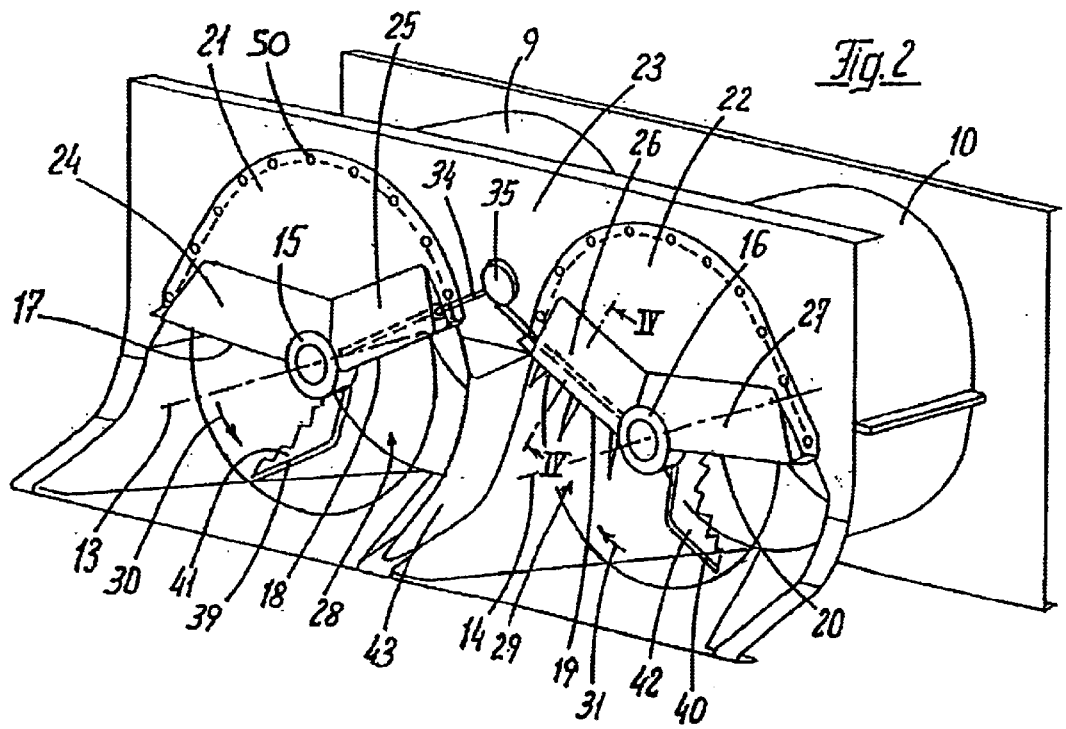
FIG. 2 is a perspective view of a double-rotor separating device having end walls as shown from the intake end thereof.

Turning now to FIG. 2, dotted lines shown on the rotor housings 9, 10 encase, at least in part, drivably mounted separating rotors 11, 12. Axles 13, 14 of the separating rotors 11, 12 are rotatably accommodated at their front ends, ointing in a direction of travel FR in bearings 15, 16. The bearings 15, 16 have a non-slip connection, to be described in more detail, to lower edges 17–20 of end walls 21, 22. The end walls 21, 22 are hood-shaped and accommodate the bearings 15, 16. The end walls 21, 22 are detachably mounted through fasteners 50, in a rearward region, to a front plate 23 bounding the material inlet region of the separating rotors 11, 12. An underside of the front plate 23 is adapted to a diameter of the delivery drum 7 and accommodated in its rearward region by the front end of the rotor housings 9, 10. To minimize wear to lower edges 17–20 of the end walls 21, 22, reinforcing profiles 24–27 are operatively attached, preferably welded, to the end walls 21, 22 in the region of the lower edges 17–20. In one embodiment, the reinforcing profiles 24–27 are made of thick-walled metal plates. The separating rotors 11, 12 pass through the intake region and the end walls 21, 22 shield the intake region, at least in part, which ensures trouble-free intake of the harvested material. The lower edges 17–20 of the end walls 21, 22 extend in a position deviating from the horizontal, along the underside of the end walls 21, 22. In alternative embodiments, only one of the lower edges 17–20 in each of the rotor housings 9, 10 assumes a position deviating from the horizontal in order to ensure trouble-free intake of the harvested material.

Intake openings 28, 29 bounded by the lower edges 17–20 of the end walls 21, 22 are as large as possible for trouble-free acceptance of harvested material. The lower edges 17–20 of the end walls 21, 22 are arranged relative to one another in such a way that they subtend between them an obtuse angle α. The obtuse angle α provides larger regions in the material inlet regions at the front ends of separating rotors, as opposed to the regions shielded by the end walls 21, 22 to accommodate larger quantities of harvested material without problem.

Figure 3:
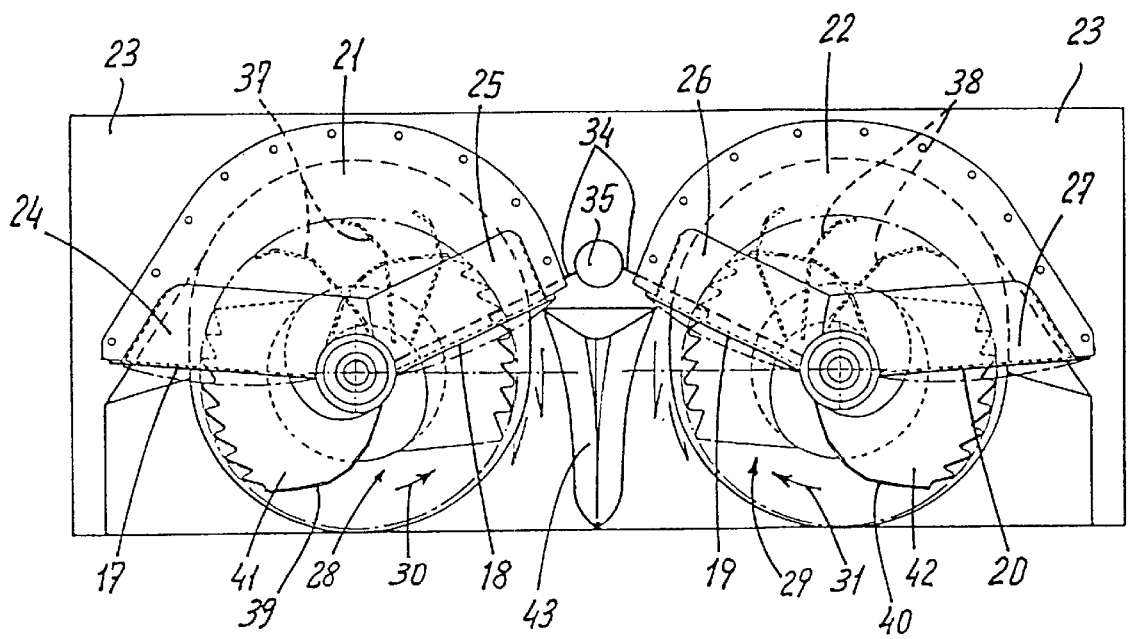
FIG. 3 is a front view of double-rotor separating device shown in FIG. 2.

FIG. 2 shows the lower edges 17–20 of the end walls 21, 22 that are plane or straight shaped. In another embodiment, FIG. 3 shows lower edges 60–63 of the end walls 21, 22 that are arc-shaped. To preclude jamming of the harvested material in the region between the front end of the separating rotors 11, 12 and the lower edges 17–20 of the end walls 21, 22, the lower edges 17–20 are arc-shaped 60–63 with the curvature of the lower edges 17–20 extending upwards in the vertical direction as shown in FIG. 3. The lower edges 17–20, having the arc-shaped 60–63 edges, assist in precluding harvested material from being caught between front edges 39, 40 of auger blades 41, 42 and the respective lower edges 17–20 having the arc-shaped 60–63, because the friction angle between the lower edges 17–20 of the arc-shaped 60–63 edges and the end walls 21, 22 of the auger blades 41, 42 is such that the harvested material moves from there. In an alternative embodiment, only the lower edges 18, 19 that oppose the directions of rotation 30, 31 are arc-shaped 61, 62 in order to preclude jamming of harvested material during the intake operation.

The lower edges 17–20 of the end wall 21, 22 are offset relative to one another in the direction of rotation 30, 31 to provide a relatively large inlet region at front ends of the separating rotors 11, 12 and so that the harvested material moves into the separation rotors 11, 12, resulting in minimal impact wear. This is achieved by having two of the lower edges 18, 19 of the corresponding end wall 21, 22 opposing the direction of rotation 30, 31 of the separating rotor 11, 12 and more strongly inclined in the vertical direction than the other two of the lower edges 17, 20 of the associated end wall 21, 22.

The stream of harvested material separated by the delivery drum 7 is passed on to the separating rotors 11, 12 in the region of the front plate 23 without interference and is rapidly conveyed away by the separation rotors 11, 12. In another embodiment, the separating rotors 11, 12 are arranged with end walls 21, 22 at the front in mirror-image relationship to one another. The lower edges 18, 19 are at a steeper incline in the vertical direction turned towards one another and the separating rotors 11, 12 rotate in opposite directions of rotation 30, 31. The stream of harvested material to the separating rotors 11, 12 is divided by a dividing wall 23 having a dividing wedge 43, which separates the harvested material at the intake regions bounded by the lower edges 18, 19 of the separating rotors 11, 12.

Figure 4:
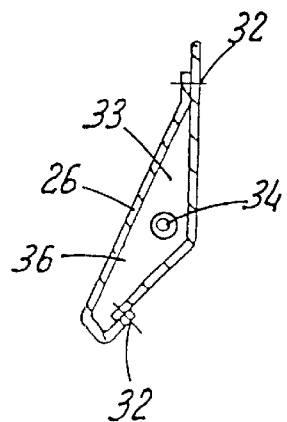
FIG. 4 is a sectional view through a lower edge of an end wall taken generally along line IV–IV in FIG. 2.
Figure 3:
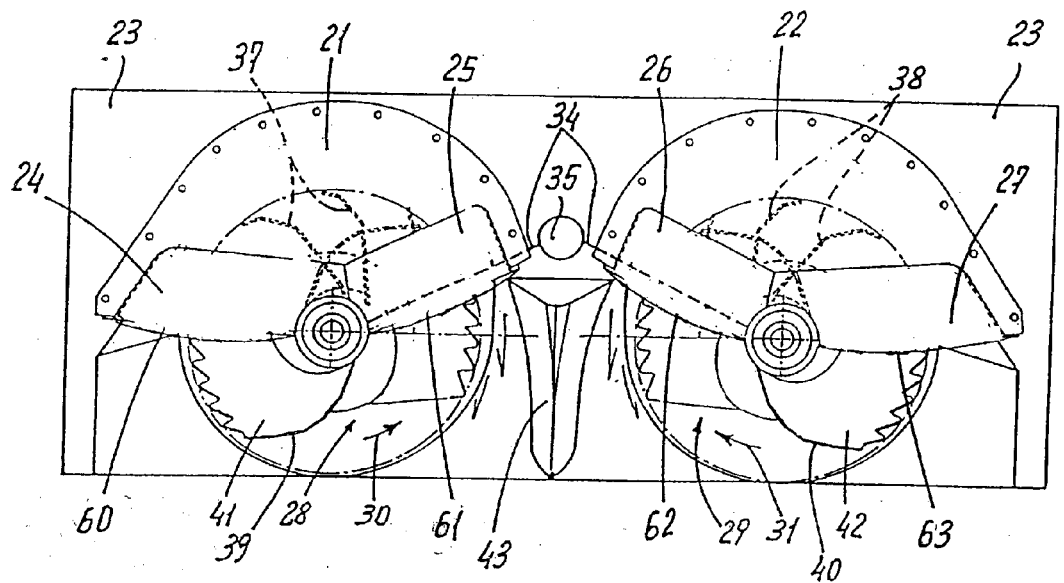
Figure 4:
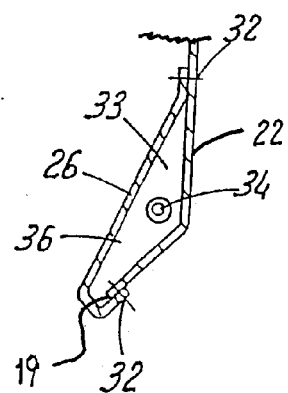

In an alternative embodiment, the reinforcing profiles 24–27 are operatively attached to the lower edges 17–20 according to FIGS. 2 and 4. The reinforcing profiles 24–27 are profile-shaped to more readily absorb high stresses occurring in the intake region of the separating rotors 11, 12. The reinforcing profiles 24–27 are detachably mounted to the respective end walls 21, 22 by means of screw connections 32, to restrict the wear of the lower edges 17–20 of the end walls 21, 22 to the worn region of the reinforcing profiles 24–27. The reinforcing profiles 24–27 are J-shaped so that there is a hollow space 33 between the strengthening profiles 24–27 and the respective end wall 21, 22, best shown in FIG. 4. A central lubricating manifold 35 receives lubricant from a storage tank (not shown) and passes the lubricant through a conduit system 34 in hollow spaces 33 to the region of the bearings 15, 16. The hollow spaces 33 of the reinforcing profiles 24–27 are constructed as lubricant channels 36. To increase the lubricating action, the conduit system 34 is assigned to each of the strengthening profiles 24–27. The lower edges 17–20 of the end walls 21, 22 having the reinforcing profiles 24–27 have high profiles and lubrication channels 36. The lubrication channels 36 contain wear-reducing lubricants in their interior for feeding lubrication to the bearings 15, 16. The conduit systems 34 are placed in front of the separating rotors 11, 12 and are close enough to the lower edges 17–20 such that the hollow spaces 33 are the lubricating channels 36.

In another alternative embodiment, stripper bars 37, 38 are assigned to the end walls 21, 22 on the inside, which support the onward conveyance of the harvested material located in the hood-shaped region of the end walls 21, 22. In order to increase the onward conveying effect, the stripper bars 37, 38 are arc-shaped and curve or point in the direction of rotation 30, 31 of the separating rotor 11, 12. In an alternative embodiment, only one of the stripper bars 37, 38 is assigned to each of the end walls 21, 22 and is not of arc-shaped, but rather is of straight construction.

The front edges 39, 40 of the rotor auger sweep the harvested material from the region of the end walls 21, 22 over the stripper bars 37, 38, and in doing so convey the harvested material located in the region between the end walls 21, 22 and the front ends of the rotor auger plates 41, 42 out of the region.

The invention disclosed herein is not restricted to designs having two separating rotors 11, 12. The invention can be employed on agricultural machines possessing any number of separating rotors 11, 12 in order to achieve the effects described.

Other objects, features and advantages will be apparent to those skilled in the art. While preferred embodiments of the present invention have been illustrated and described, this has been by way of illustration and the invention should not be limited except as required by the scope of the appended claims.

I claim:

1. A self-propelled harvester having an axial separator rotor mounted in a rotor housing, and a front plate extending outwardly from and defining an inlet opening for the housing, further comprising:
   an end wall operatively connected to the front plate and covering an upper portion of the inlet opening, the end wall having first and second lower edges which are at an obtuse angle to each other;
   a rotor bearing located at the lower edges and supported by the end wall;
   reinforcement means operatively connected to the end wall for reinforcing the end wall and proximate to at least one of the lower edges for reducing wear of same; and
   the end wall and reinforcement means being constructed and arranged to provide an enclosed space therebetween.

2. The self-propelled harvesting machine according to claim 1, wherein the first and second lower edges are arcuate with opposite ends extending upwardly in a substantially vertical direction.

3. The self-propelled harvesting machine according to claim 1, wherein the reinforcement means includes a J-shaped wear plate, and further comprising a lubricating conduit located within said enclosed space.

4. A self-propelled harvester having an axial separator rotor mounted in a rotor housing, and a front plate extending outwardly from and defining an inlet opening for the housing, further comprising:
   an end wall operatively connected to the front plate and covering an upper portion of the inlet opening, the end wall having first and second lower edges;
   a rotor bearing located at the lower edges and supported by the end wall;
   a wear plate mounted on the end wall proximate to one of the lower edges and upstream of a flow of material into the rotor housing, the wear plate being J-shaped in cross-section; and
   the end wall and wear plate being constructed and arranged to provide an enclosed space therebetween.

5. The self-propelled harvester according to claim 4, including means for detachably mounting the end wall to the front plate.

6. The self-propelled harvester according to claim 4, including means for detachably mounting the wear plate to the end wall.

7. The self-propelled harvester according to claim 4, wherein the first and second edges are at an obtuse angle to each other.

8. The self-propelled harvester according to claim 4, wherein the first and second lower edges are arcuate with opposite ends extending upwardly in a substantially vertical direction.

9. The self-propelled harvester according to claim 4, further comprising a stripper bar located within the inlet opening and proximate to the end wall.

10. A self-propelled harvester having an axial separator rotor mounted in a rotor housing, and a front plate extending outwardly from and defining an inlet opening for the housing, further comprising:
   an end wall operatively connected to the front plate and covering an upper portion of the inlet opening, the end wall having first an second lower edges;
   a rotor bearing located at the lower edges and supported by the end wall;
   a wear plate mounted on the end wall proximate to one of the lower edges and upstream of a flow of material into the rotor housing;
   the end wall and wear plate being constructed and arranged to provide an enclosed space therebetween; and
   a lubricating conduit within the enclosed space.

11. The self-propelled harvester according to claim 10, wherein the lubricating conduit is operatively connected to the rotor bearing, and further comprising a lubricating manifold at the front plate and operatively connected to the lubricating conduit for passing a lubricant through the lubricating conduit to the rotor bearing for lubrication of the rotor bearing.

12. A self-propelled harvester having a first rotor housing and a second rotor housing, the first and second rotor housings operatively connected by a front plate, comprising:
   a first end wall operatively connected to he front plate and substantially aligned with the first rotor housing, the first end wall having a first lower edge and a second lower edge;

a first wear plate having an upper side and a lower side, the first wear plate operatively connected to the first end wall and proximate to the first and second lower edges, the first wear plate being constructed and arranged to form a first space between the first end wall and the first wear plate lower side;

a first bearing located at the first and second lower edges and supported by the first end wall;

a second end wall operatively connected to the front plate and substantially aligned with the second rotor housing, the second end wall having a third lower edge and a fourth lower edge;

a second wear plate having an upper side and a lower side, the second wear plate operatively connected to the second end wall and proximate to the third and fourth lower edge, the second wear plate being constructed and arranged to form a second space between the second end wall and the second wear plate lower side;

a second bearing located at the third and fourth lower edges and supported by the second end wall;

a lubricating manifold operatively connected to the front plate;

a first lubricating conduit located within the first space and connected to the lubricating manifold; and a second lubricating conduit located within the second space and connected to the lubricating manifold.

13. The self-propelled harvester according to claim 12, wherein the first lubricating conduit is operatively connected to the first bearing and the second lubricating conduit is operatively connected to the second bearing.

14. The self-propelled harvester according to claim 12, wherein the lower edges are arcuate with opposite ends extending upwardly in a substantially vertical direction.

15. The self-propelled harvester according to claim 12, further comprising:

a dividing wedge connected to the front plate and located between the first and second rotor housings.

16. The self-propelled harvester according to claim 12, wherein the first and second rotor housings are mirror-images of one another.

* * * * *

UNITED STATES PATENT AND TRADEMARK OFFICE
CERTIFICATE OF CORRECTION

PATENT NO.    : 6,679,773 B2
DATED         : January 20, 2004
INVENTOR(S)   : Berthold Schwersmann It is certified that error appears in the above-identified patent and that said Letters Patent is hereby corrected as shown below:

Drawings,
Include numerals 60-63 in Fig. 3 as shown in the attached drawing.
Include numerals 19 and 22 in Fig. 4 as shown in the attached drawing.

Column 3,
Line 47, change the word "ointing" to -- pointing --.

Signed and Sealed this

Twenty-fourth Day of August, 2004

JON W. DUDAS
*Director of the United States Patent and Trademark Office*